United States Patent [19]
Ohlhoff

[11] 3,808,922
[45] May 7, 1974

[54] CIRCULAR SAW MACHINES

[75] Inventor: Hans-Jürgen Ohlhoff, Ulm (Danube), Germany

[73] Assignee: Wieland-Werke AG, Ulm (Danube) Postfach, Germany

[22] Filed: Apr. 13, 1973

[21] Appl. No.: 351,069

[30] Foreign Application Priority Data
Aug. 19, 1972 Germany.............................. 2240938

[52] U.S. Cl......................... 83/168, 83/169, 83/170
[51] Int. Cl............................................... B26d 7/08
[58] Field of Search....................... 83/168, 169, 170

[56] References Cited
UNITED STATES PATENTS
2,838,825 6/1958 Knollenberg...................... 83/169 X
3,460,418 8/1969 Mathe et al............................ 83/168

Primary Examiner—Donald R. Schran
Attorney, Agent, or Firm—Ladas, Parry, Von Gehr, Goldsmith & Deschamps

[57] ABSTRACT

A circular saw machine in which the circular saw blade is mounted on a carriage and moved towards the work piece to be cut and a nozzle or nozzles are moved along with the saw blade for spraying, lubricating and cooling liquid onto the saw blade.

6 Claims, 7 Drawing Figures

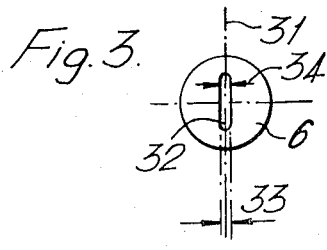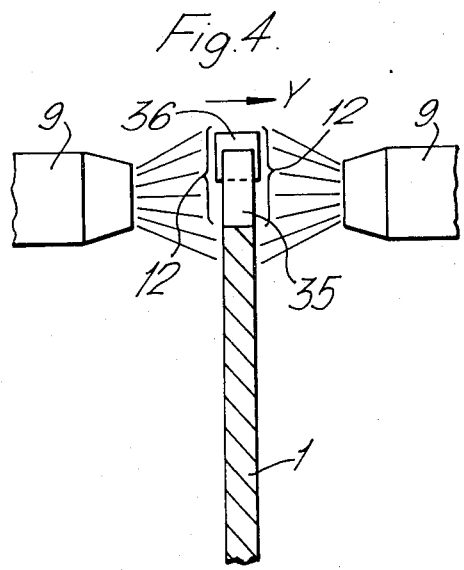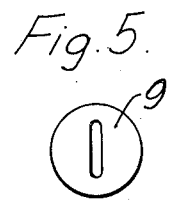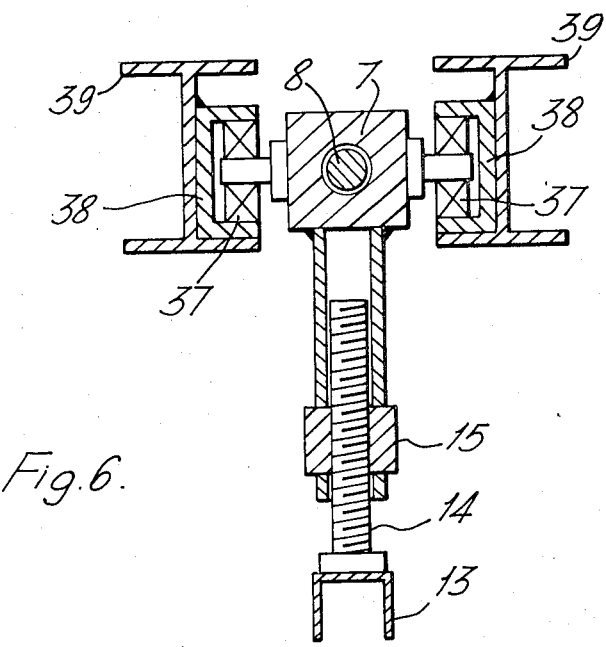

CIRCULAR SAW MACHINES

FIELD OF THE INVENTION

The invention relates to circular saw machines, particularly intended for cutting soft metal at high speed.

BACKGROUND OF THE INVENTION

In known machines of this type, the saw blade is carried on a saw carriage movable below the saw table. A nozzle for spraying cooling and lubricating medium onto the saw blade is arranged on the saw carriage and like a finger enters the saw cut behind the saw blade from below in relation to the work piece and at this point sprays the saw blade with the cooling and lubricating liquied immediately as the saw blade emerges from the work piece. The nozzle finger thus must be smaller than the width of the saw cut so that it can be moved together with the saw blade as the saw cut is being formed in the work piece. Thus the cross-section of the nozzle, which to a large extent is limited in size, in turn limits the stream of the cooling and lubricating liquid which can be fed to the saw blade so that sufficient cooling becomes difficult at greater cutting speeds. Of particular disadvantage is further than at high cutting speeds the cooling and lubricating liquid because of centrifugal force is thrown off from the saw blade before the saw blade enters the work piece so that just in the cutting area there is a lack of cooling and lubricating fluid. Thus with known saws of the described construction, used for example on work pieces made from copper alloy and having a thickness of 25 mm., the saw blade can only be moved forward with a maximum speed of about 1,000mm. per minute. These feeding speeds are too small in practice particularly when the saw is arranged as part of a finishing line working at a substantially higher through speed.

OBJECT OF THE INVENTION

The object of the invention is thus to provide a circular saw machine of the above described type which is of such a construction that it can operate with substantially higher feeding speeds for the saw blade.

SUMMARY OF THE INVENTION

According to the invention we provide a circular saw machine, particularly for cutting soft metal at high speed, comprising a circular saw blade projecting through a slot in a work-piece carrying table, a lower carriage movable below the table and adapted to feed the circular saw blade towards the work piece in the cutting direction, and an upper carriage arranged above the work table adapted to be moved along synchronously with the lower carriage, and a nozzle carried by the upper carriage to feed a jet of cooling or lubricating medium substantially radially into the saw teeth immediately before entering the work piece. In the preferred constructional form, the nozzle is in the form of a flat jet nozzle whereby the plane of the flat jet lies in the plane of the saw blade and the thickness of the flat jet is not substantially greater than the thickness of the saw blade. The cooling or lubricating liquid is sprayed roughly radially between the front and rear of each tooth in the gaps between the individual teeth of the saw blade and this is effected immediately prior to the saw blade entering the work piece so that the cooling or lubricating liquid is practically completely carried into the cutting area and effectively used therein. For additionally cooling or lubricating of the saw blade, there may be arranged on the carriage on both sides of the saw blade each a further lateral nozzle, the jets of which are directed onto the saw blade roughly at right angles to the plane of the saw blade and hit the saw blade roughly at its crest within the area of the saw tooth circle. The lateral nozzles are preferably constructed in the form of flat jet nozzles whereby the plane of the jet is directed towards the saw blade and the width of the jet measured in the plane of the jet at the point of impingement on the saw blade roughly corresponds to the height of the saw teeth so that the saw teeth when passing the lateral nozzles are covered to their full height with cooling or lubricating medium. Since the saw blade usually only projects out of the work piece upwardly for a small amount, the distance between the crest of the saw blade and the point where the saw blade enters the work piece is comparatively small so that the amount of cooling and lubricating liquid deflected from this path as a result of the high speed of rotation of the saw blade is kept to a minimum.

The carriage may be provided with a box for catching the shavings and chips and this box overlaps the saw blades and the lateral nozzles can be mounted in a particularly simple manner on this box. This box serves for catching the chips carried up on the rear of the saw blade when re-emerging from the work piece and these chips at high cutting speed are thrown off upwardly with great speed. The box for catching the chips is preferably arranged so that it is vertically adjustable so that the box for the chips themselves as well as the position of the nozzles can be adjusted to the particular saw blade diameter as well as the thickness of the work piece.

The technical advance obtained by the invention essentially resides in that in the saw machine according to the invention, the cooling and lubricating liquid is supplied to the saw blade in a directed manner immediately before the saw blade enters into the work piece so that the cooling and lubricating liquid is fully utilised in the cutting area whereby in the result when using small amounts of liquid such an intensive cooling and lubrication is obtained that without difficulties the feeding speeds of the saw blades can be increased at least threefold compared with known saws.

BRIEF DESCRIPTION OF THE DRAWINGS

A construction form of the invention will now be described in greater detail in the following detailed description having reference to the accompanying drawings, wherein:

FIG. 3 shows the nozzle as seen in direction X;

FIG. 4 shows to a larger scale additional nozzles arranged laterally to the saw blade;

FIG. 5 shows the thickness of the jets emitted from these additional nozzles; and FIG. 6 shows in a detailed section taken along line VI—VI the manner of suspending the box for catching the chips.

DESCRIPTION OF THE PREFERRED EMBODIMENT

Figure 1:
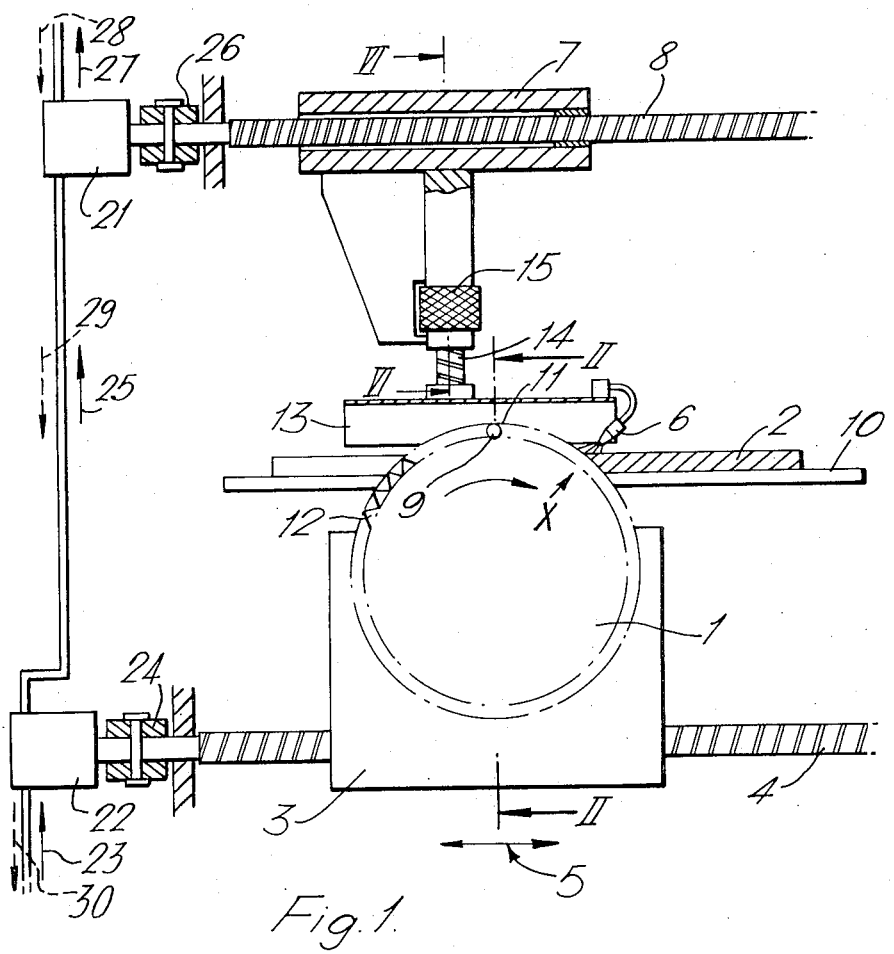
FIG. 1 shows a lingitudinal section through a circular saw machine constructed according to the invention in the plane of the saw blade.

In the drawing, a circular saw blade 1 is indicated to rotate anti-clockwise towards the work piece 2 which is shown in outline only resting on the saw table 10 and is stationary or could be adapted to be moved from right to left. The saw blade 1, which is made from hard metal, is carried in a saw carriage 3 which is displaceable in the direction of the double arrow 5 by means of a feed spindle indicated at 4. The manner of guiding the saw carriage 3 is illustrated in FIG. 2b and will be described in greater detail below. A nozzle 6 which is moved together with the forward movement of the saw blade 1 is used for spraying lubricating and cooling fluid onto the saw blade. The nozzle 6 is carried on an overhead carriage 7 which is movably located above the saw blade 1 and adapted to be moved synchronously with the saw blade. For the sake of clarity, the guide means for carriage 7 has been omitted from FIG. 1 and there is illustrated in this figure only an upper feed spindle 8 which drives the carriage synchronously with the saw carriage 3. This nozzle 6 is arranged on the carriage 7 in such a manner that the saw blade 1 is sprayed substantially radially and immediately prior to its entering the work piece 2. The nozzle 6 causes the stream to issue in the form of a flat jet whereby the plane of this flat jet lies in the plane of the saw blade and the thickness of the flat jet is not substantially greater than the thickness of the saw blade, this being visible in detail from FIG. 3. In any case, this formation of the nozzle 6 has for its consequence that the cooling or lubricating liquid sprayed substantially radially into the gaps between adjacent teeth of the saw blade 1 is fully carried along with the blade into the cutting area and is there very effectively used.

For additionally cooling or lubricating the saw blade 1, the carriage 7 on both sides of the saw blade 1 carries further nozzles 9, the jets of which are directed in a general transverse direction towards the saw blade 1 (see FIG. 4) and are adapted to hit the saw blade in the area of its crest 11 within the path or circle of the saw blade teeth 12. As shown in FIG. 4, the saw teeth may be reinforced with hard metal tips 36. These lateral nozzles 9, in the constructional form shown in FIG. 5 are also shaped to produce flat jets whereby the planes of the jets are directed roughly at right angles to the saw blade as seen in FIG. 2 and, measured in the plane of the jet, the width of the jet on hitting the saw blade roughly corresponds to the height of the saw teeth. As can be seen further from FIG. 1, the carriage 7 is provided with a box 13 for catching the chips, and the nozzles 6 and 9 are mounted on this box. This box 13 is suspended from the upper carriage 7 and is adjustable in a vertical direction as can be seen clearly in FIG. 6. In the constructional form shows a vertical spindle 14 is provided for this purpose and a nut 15 co-operating with the spindle is rotatably carried on the carriage but cannot be displaced in an axial direction.

As shown in FIG. 2b, a driving shaft 17 for the saw blade 1 is held in bearings 16. The driving shaft 17 may be driven for example via a belt pulley 18; or any other suitable drive such as gears may be employed.

Figure 2B:
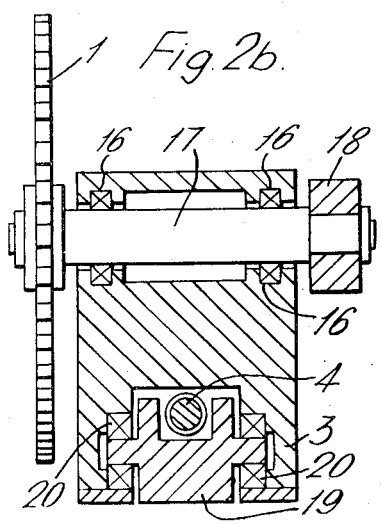
FIG. 2b shows in another section taken along lines II—II the manner of guiding the saw carriage.
Figure 2A:
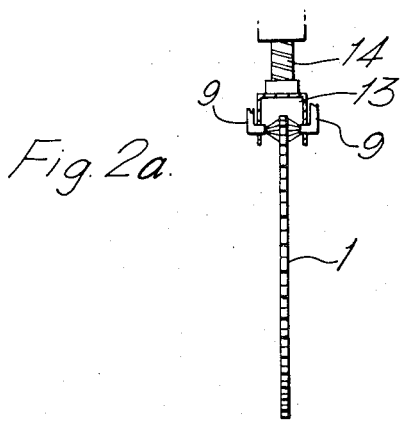
FIG. 2a shows a fragmentary section taken along lines II—II through the saw blade shown in FIG. 1, the saw carriage carrying the saw being omitted for simplicity.

The saw carriage 3 may be guided on a flat, profiled rail 19 through the centre of whic passes the feed spindle 4 shown in FIG. 1. In the form shown, the carriage 3 runs on rail 19 with roller bearings 20.

To the left of FIG. 1, we have shown the means of driving the overhead carriage 7 synchronously with saw blade 1. For this purpose a hydraulic motor 21 drives upper feed spindle 8 and hydraulic motor 22 drives lower feed spindle 4. Oil from a pumping station is supplied as indicated by arrow 23 and drives hydraulic motor 22 and thus spindle 4 via a coupling 24. The oil leaving motor 22 continues in the direction indicated by arrow 25 and drives hydraulic motor 21 which in turn drives spindle 8 via a coupling 26. The oil leaving motor 21 in the direction indicated by arrow 27 is returned to a reservoir (not shown).

The description and drawings illustrate the manner in which the parts co-operate during the sawing operation. After this has been completed, the carriages 3 and 7 return to their initial position rather more quickly than during movement in the opposite direction during the working cycle. During this return of the carriages, the oil driving the hydraulic motors moves in the direction indicated by broken arrows 28, 29 and 30.

Referring to FIG. 3, the jet issuing from nozzle 6 has thickness 34. The plane of the saw blade 1 is indicated by chain line 31. The opening of the nozzle 6 is thus roughly in the form of a narrow rectangle 32, the longer axis of which lies in the plane 31 of the saw blade 1. The thickness of the jet is roughly equal to the thickness of the saw blade 33 as shown in outline in the lower part of FIG. 3.

Referring to FIG. 6, roller bearing 37 functions similarly to bearings 20 shown in FIG. 2b. Flat profiled rails 38 function very much like rail 19 shown in FIG. 2b. Rails 38 are carried on supports 39.

We claim:

1. A circular saw machine, for cutting soft metal at high speed, comprising a circular saw blade projecting through a slot in a work piece carrying table, a lower carriage movable below the table and adapted to feed the circular saw blade towards a work piece in the cutting direction, and an upper carriage arranged above the work table adapted to be moved along synchronously with the lower carriage, and a nozzle carried by the upper carriage to feed a jet of cooling or lubricating medium substantially radially into the saw teeth immediately before entering the work piece.

2. A saw machine according to claim 1 wherein the nozzle is in the form of a flat jet nozzle whereby the place of the flat jet lies in the plane of the saw blade and the thickness of the flat jet is not substantially greater than the thickness of the saw blade.

3. A saw machine according to claim 1 wherein for additionally cooling or lubricating the saw blade, there are arranged on the upper carriage on each side of the saw blade an additional nozzles whose jets are directed at right angles to the plane of the saw blade and hit the saw blade in the area of the saw tooth circle.

4. A saw machine according to claim 3 wherein the lateral nozzles are in the form of flat jet nozzles wherey the planes of the jets are directed roughly radially to the saw blade and the width of the jet measured in the plane of the jet corresponds to the height of the saw teeth at the point at which the jet impinges on the saw blade.

5. A saw machine according to claim 1 wherein the upper carriage has suspended from it a box for catching the saw chips and the nozzles are mounted on this box.

6. A saw machine according to claim 5 wherein the box for catching the chips is vertically adjustable.

* * * * *